US006684519B1

(12) United States Patent
McAllisterr

(10) Patent No.: US 6,684,519 B1
(45) Date of Patent: Feb. 3, 2004

(54) MITER SAW STAND WITH ADJUSTABLE LAYOUT MEASURING APPARATUS

(76) Inventor: Etienne McAllisterr, 26117 White Spruce, Eagle River, AK (US) 99577

( * ) Notice: Subject to any disclaimer, the term of this patent is extended or adjusted under 35 U.S.C. 154(b) by 0 days.

(21) Appl. No.: 10/143,428

(22) Filed: May 9, 2002

(51) Int. Cl.[7] .............................................. G01D 21/00

(52) U.S. Cl. ............................ 33/640; 33/641; 33/628; 33/626; 33/630; 83/522.17; 83/490; 83/471.3; 83/473

(58) Field of Search .......................... 33/640, 641, 628, 33/626, 630; 83/522.17, 522.18, 522.19, 522.2, 522.21, 490, 471.3, 473

(56) References Cited

U.S. PATENT DOCUMENTS

| | | | | | |
|---|---|---|---|---|---|
| 4,638,564 | A | * | 1/1987 | Burrows | 33/628 |
| 4,798,113 | A | * | 1/1989 | Viazanko | 83/490 |
| 4,928,395 | A | * | 5/1990 | Good | 33/374 |
| 4,972,749 | A | * | 11/1990 | Grove | 83/522.18 |
| 5,105,862 | A | * | 4/1992 | Skinner et al. | 83/471.3 |
| D366,050 | S | * | 1/1996 | Hinds | 83/471.3 |
| 5,487,319 | A | * | 1/1996 | Cody | 33/640 |
| 6,195,905 | B1 | * | 3/2001 | Cole | 33/640 |
| 6,256,899 | B1 | * | 7/2001 | McGhee | 33/640 |
| 6,279,240 | B1 | * | 8/2001 | Bonaventura, Jr. | 33/374 |
| 2002/0100174 | A1 | * | 8/2002 | Gooden | |
| 2002/0157731 | A1 | * | 10/2002 | Harper | |

* cited by examiner

*Primary Examiner*—Christopher W. Fulton
*Assistant Examiner*—Amanda J. Hoolahan
(74) *Attorney, Agent, or Firm*—Michael J. Tavella

(57) ABSTRACT

It is a miter saw table that has adjustable measuring tapes. The tape sections can be calibrated so that the zero point on the tape is always set at the outer surface of the blade. This is done by using slidable wings that can be secured to a base. The wings a readjusted until the built-in tapes match a control tape. Once the wings are set, cuts can be made quickly by either setting a stop at the precise distance needed, or by sliding the board under the blade until the end of the board aligns with the desired measurement. The board can then be accurately cut without having to measure and mark the board first. Moreover, if the blade is changed during the course of work. The measuring system can be quickly re-calibrated to the thickness of the new blade and cuts can immediately be resumed.

20 Claims, 6 Drawing Sheets

MITER SAW STAND WITH ADJUSTABLE LAYOUT MEASURING APPARATUS

BACKGROUND OF THE INVENTION

1. Field of the Invention

This invention relates to miter saw stands and particularly to miter saw stands having layout measuring devices.

2. Description of the Prior Art

One of the most used tools found in modern construction is the miter saw. This saw allows a user to cut materials in various lengths and at many different angles. These saws typically have a movable blade assembly that is mounted on a base. The base is typically no more than two feet wide. Ordinarily, this limits the length of board that can be cut. To make these saws more effective, miter saw stands are often built to support them. These stands typically hold the saw in a fixed position and have extension wings extending from both sides of the saw. Typically the height of these wings is set to match the height of the saw base. In this way, a board placed on the saw table is fully supported by the wings. Using the wings allows longer lengths of boards to be safely cut, thereby increasing the saw's usefulness.

As these stands increased in use, improvements were developed: fences were added to the wings to better align the wood being cut; stop block systems were created to allow for repetitive cuts; and finally, measuring systems were added for the convenience of the user. Despite these improvements, accurate and convenient measurements remain a problem with the use of these devices. For example, in the most basic case, a user must use a measuring device (e.g., a tape measure) to measure the board for a cut. A mark is made on the board for each cut and then the cut is made. For one or two cuts, this is not a problem. However for many cuts, this procedure can become time consuming and inaccurate as the marks can vary from board to board.

As mentioned above, the use of stop blocks can reduce the measuring required for repetitive cuts. However, to use the stop effectively, it must be accurately placed on the fence to make proper length cuts. To position the stop block, the user typically uses a tape measure to measure from the side of the blade to the position of the desired length to be cut. The stop is then placed on the fence and secured in place. This measurement must be rechecked every time a blade is changed, the table is closed up for storage, or the saw is moved.

Some saw tables incorporate lengths of tape measure on the wing's surface. This makes some layout convenient because the measurement can be made without having to use a standard tape measure. However, because these tapes are not aligned with the blade, the measurement must be made and the board marked before the cut, similar to the practice using an ordinary tape measure. What is needed then is a system installed on a miter saw table that allows a measuring tape to be adjustable so that it can be calibrated to the saw blade and then adjusted if the saw, or blade, is moved or changed in any way.

BRIEF DESCRIPTION OF THE INVENTION

The instant invention overcomes the difficulties. It is a miter saw table that has adjustable measuring tapes. The tape sections can be calibrated so that the zero point on the tape is always set at the outer surface of the blade. This is done by using slidable wings that can be secured to a base. The wings are adjusted until the built-in tapes match a control tape. Once the wings are set, cuts can be made quickly by either setting a stop at the precise distance needed, or by sliding the board under the blade until the end of the board aligns with the desired measurement. The board can then be accurately cut without having to measure and mark the board first. Moreover, if the blade is changed during the course of work. The measuring system can be quickly recalibrated to the thickness of the new blade and cuts can immediately be resumed.

The system uses a tape measure that is secured to a movable wing of the saw stand. A tape measure is used to align the built-in tape to the blade, by moving the wing. When the built-in tape is aligned with the standard tape measure, the wing is locked down in place. Then, all measurements made with the built-in tape will be accurate to the width of the blade installed in the saw. As often happens on a construction job, saw blades are changed. Many times these blades may be thicker or thinner that the blade being replaced. This can result in a 1⁄16-inch error or more in the accuracy of cuts. While such errors are sometimes tolerable, many times they are not. Using this system prevents the error from happening in the first place. By recalibrating the built-in tape measure when blades are changed (or if the saw is moved) the user is assured of accurate cuts every time under any condition.

DETAILED DESCRIPTION OF THE INVENTION

Figure 1:
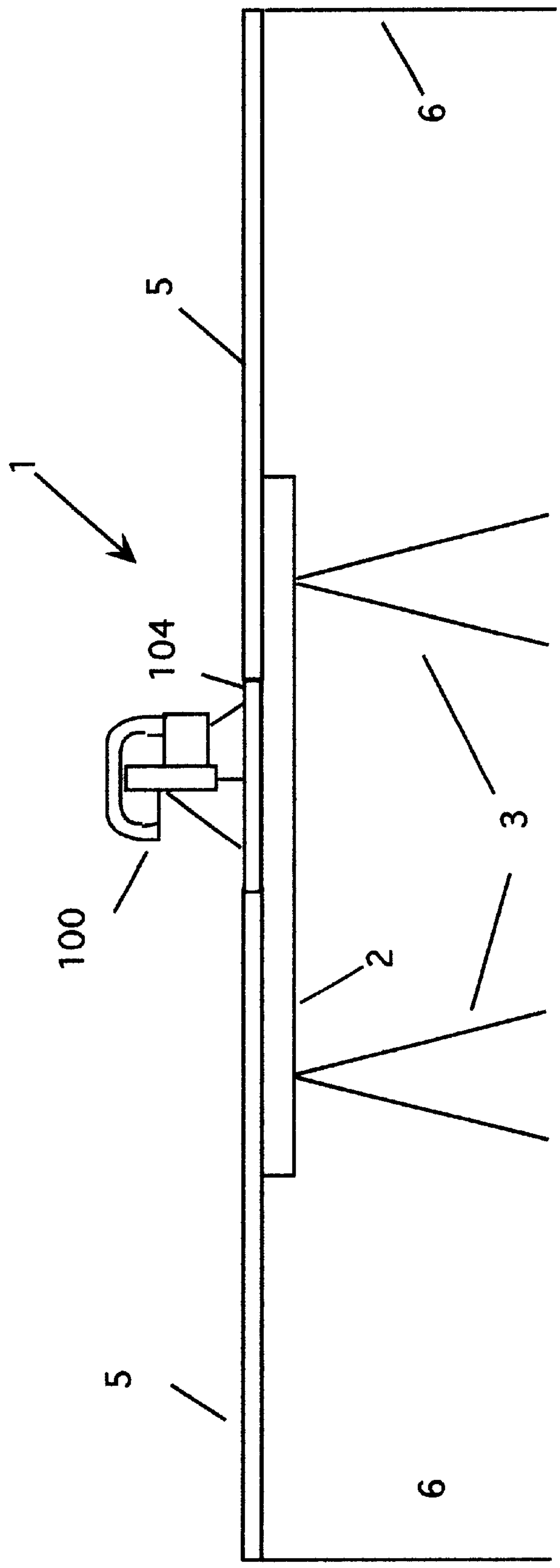
FIG. 1 is a front view of the invention as fully deployed.

Referring now to FIG. 1, the miter saw table 1 is shown. The miter saw table 1 has a central base 2 that supports a miter saw 100. A pair of legs 3 is used to support the base 2. Note that the legs can be of any style ranging from saw horses to metal telescoping legs. The purpose of the legs is to hold the base 2 above the ground at a suitable height and to provide a stable support for the saw. The miter saw 100 typically has a table 101 that has an angle adjustment platform built in it. Typically, these saws also have a small fence along the back for supporting a work piece. When installed in the miter saw table 1, the saw is positioned in the center of the base 2. Typically, the saw is bolted or screwed into the base to keep it stable when used. The table of the miter saw is typically raised about the base unit about 2 inches (50.8 mm). When laying short boards on the saw table for cutting, there is usually enough support to make the cut easily. For longer boards, however, additional support is required. To provide this additional support, two wings 5 are attached to the base. The wings 5 extend outward from the saw as shown. The wings can be different lengths. Typically, the wings can be a total of 4 feet (1.2m), 6 feet (1.8m) or 8 feet (2.4m) per wing. Two 8-foot (2.4m) wings attached to the base provide the ability to center cut a 16-foot (4.8m) long board quite easily. For the longest length wings, additional support legs 6 may be used. These legs may be hinged to the bottom of the wings so that they can fold down and lock into place when needed. The height of the wings 5 is designed to exactly match the height of the saw table. In this way, a board place on the wings rests flat and true on the saw table when cutting. This provides the most accurate and safest method of cutting long lengths of wood.

Figure 2:
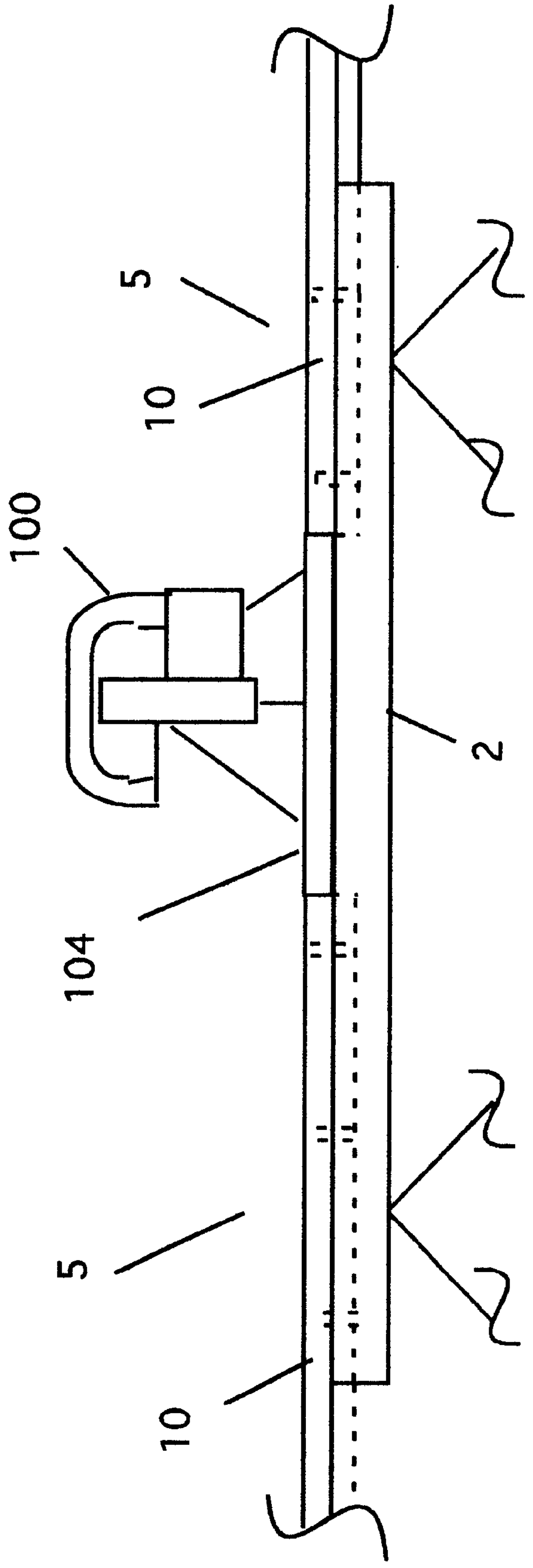
FIG. 2 is a front detail view of the adjustable table portions.
Figure 5:
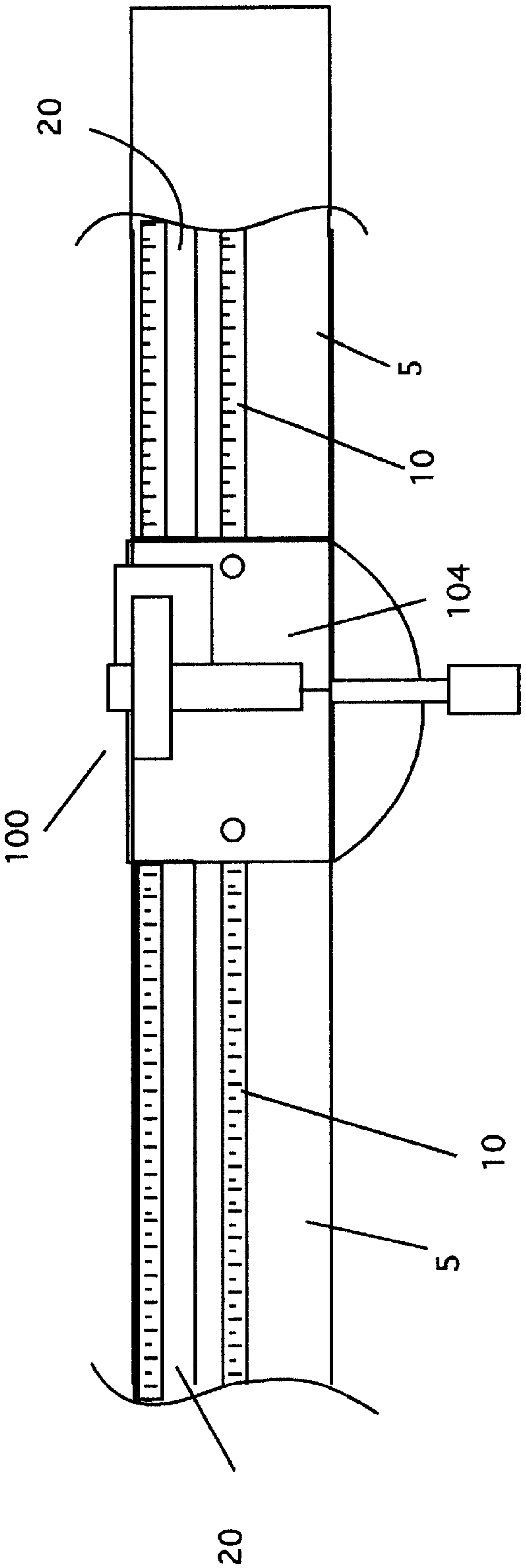
FIG. 5 is a top detail view of the invention showing a rear vertical fence and auxiliary tape.

As shown in FIGS. 2 and 5, tape measures 10 are placed in the wings. The tape measures 10 are recessed into the wings so that they do not interfere with the smooth flow of the wood as it is being cut. In the preferred embodiment, the measurement markings are etched into the tape to ensure long life (printed lines are quickly scratched or worn off the surface, making the tapes unusable). A key feature of this invention is the ability to adjust the position of the wings so that the built-in tape measures always correlate to the blade surface.

In other designs, the tapes are simply placed on the wings and are not correlated to the blade at all. Measurements using those designs require the user to line up the end of the board to the end of the tape and to go back and mark the board where the cut is desired. The user then slides the board into the saw until the mark aligns with the blade.

The system in the instant invention eliminates the need for separately marking the boards. The board is placed in the saw and pushed along the wings until the end of the board aligns with the desired measurement shown on the tape. The cut can then be made straightaway.

Although this system is faster and easier, there are times when the blade or even the entire saw is changed or the saw is moved to a new position. In these cases, the saw blade may no longer be correlated to the tapes. Although the error may be slight, in finish work, an error of even a 1/16 of an inch (1.6-mm) may be too great. To eliminate the error, the wings can be adjusted so that the tapes can be re-calibrated with the new blade position.

Figure 4:
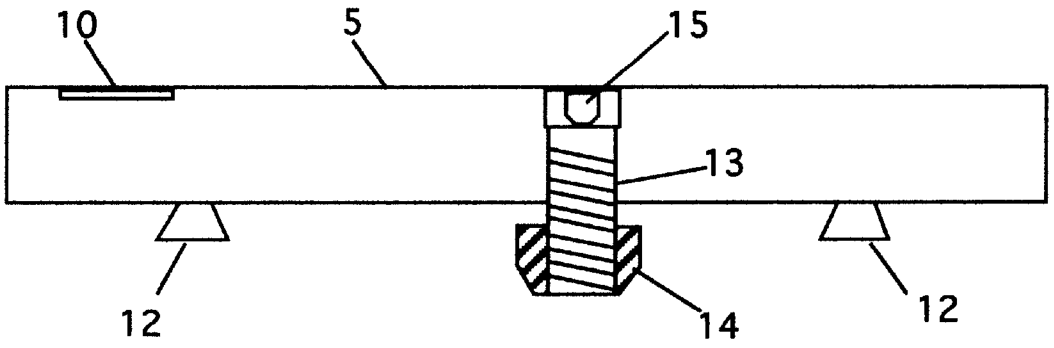
FIG. 4 is a detail cross-section of the adjustable wing showing the securing nut in position.
Figure 4A:
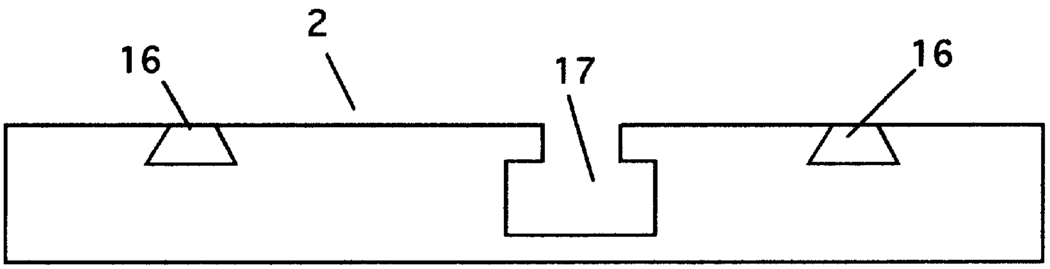
FIG. 4*a* is a detail cross-section of the table base showing the receiving track.
Figure 4B:
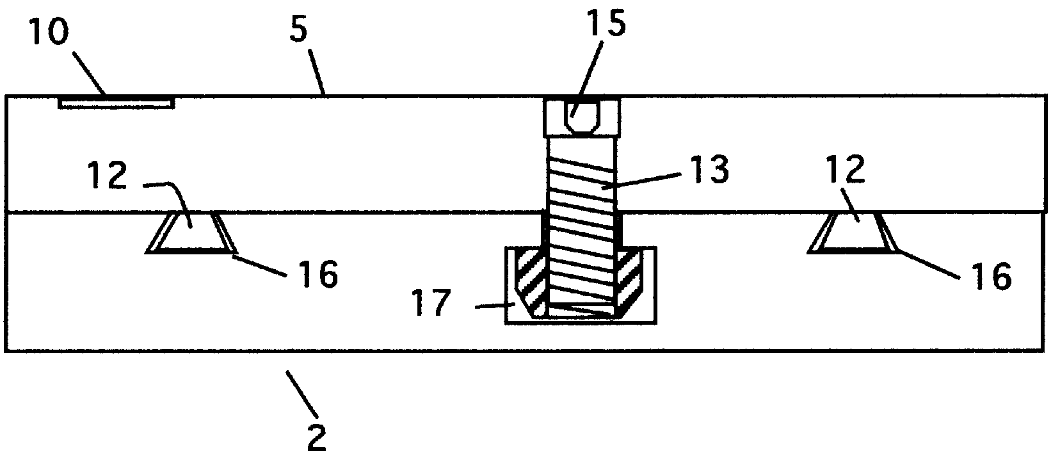
FIG. 4*b* is a detail cross-section of the wing and base connected together, ready for use.

This is accomplished by making the wings adjustable with respect to the blade. The system is shown in FIGS. 4, 4*a* and 4*b*. FIG. 4*a* shows a cross-section of one of the wings 5. As shown, the wing has a recessed tape measure 10 installed in the top of the wing. The tape is designed to sit near the back of the wing so that it does not interfere with the adjustment mechanism. At the bottom of the wing are two dovetails 12. Two dovetails are preferred because they limit the amount of transverse movement of the wing. A bolt 13 and nut 14 are shown in place in the wing. The bolt and nut extend below the bottom surface of the wing because they are designed to fit in a track in the base (as discussed below). The bolt 13 has a recessed head 15 so that it does not protrude above the top of the wing.

Figure 3:
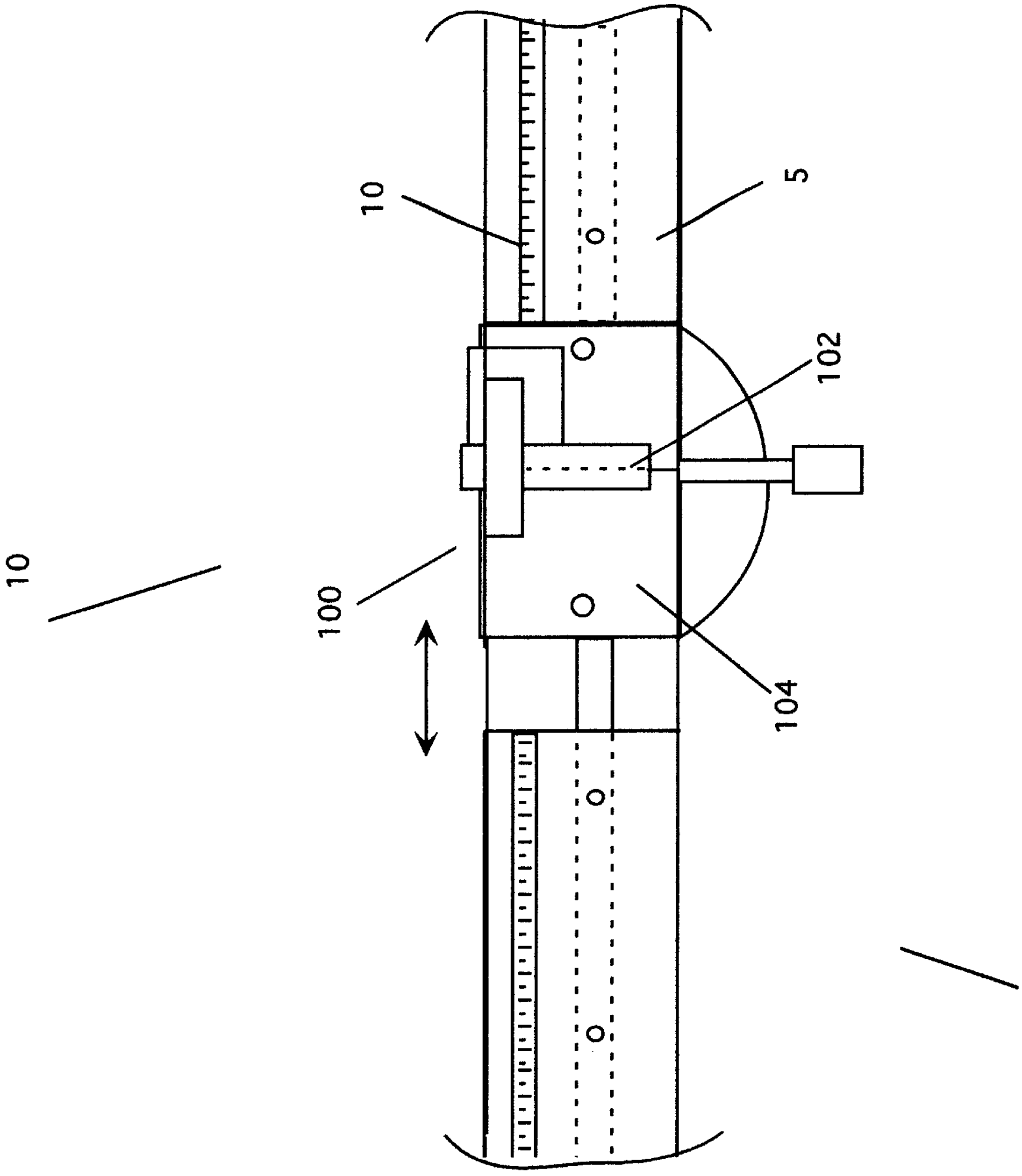
FIG. 3 is a top view the adjustable table.

FIG. 4*a* shows a cross-section of the table base 2 two dovetail slots 16 are cut into the table base to receive the dovetails 12 from the wing. A formed slot 17 is placed in the table base as shown. In the preferred embodiment, this slot is a formed member of extruded material. The slot is shaped to receive the bolt 13 and nut 14 from the wing. Note also that, depending on the length of the wing, more than one bolt and nut may be used (see e.g., FIGS. 2 and 3) to secure the wing to the base.

FIG. 4*b* shows the wing 5 installed in the base 2. Note how the dovetails align in the dovetail slots. The bolt 13 and nut 14 are designed to slide in the track until the bolt is tightened.

Once the wing is aligned properly, the bolt(s) 13 and nut(s) 14 can be tightened. When tightened, the nut pulls up against the track, which secures the wing to the base. To remove or adjust the wing, the bolt(s) 13 and nut(s) 14 are loosened and the wing can be pulled or pushed as needed to reposition it. Thus, to calibrate the tape initially, the wing is slid into place on the base. Then, a standard tape measure is placed on the wing, with the end of the tape against the blade. The wing is then moved until the inscribed tape is aligned with the standard tape measure. At that point, the bolt(s) 13 and nut(s) 14 are tightened and the wing is ready for use. This procedure is repeated for the other wing. Once both wings are adjusted and set, the saw table is ready for use.

Figure 6:
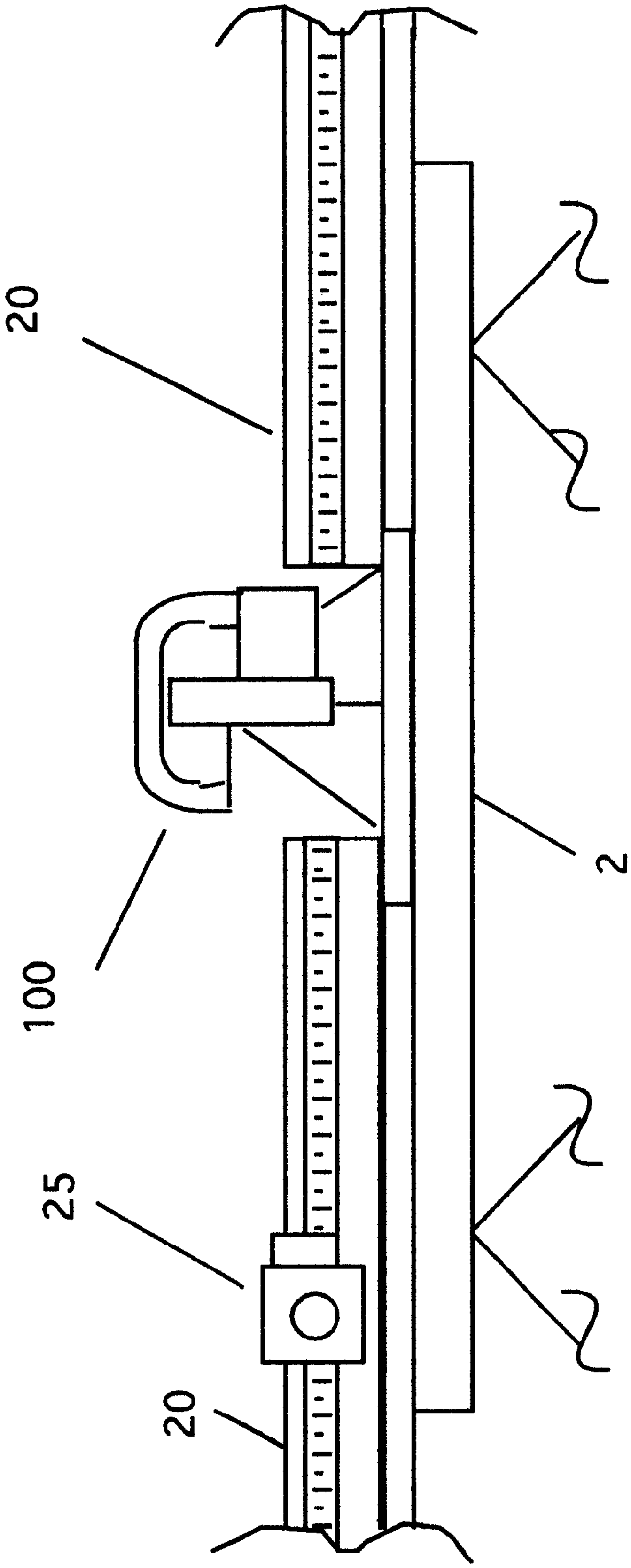
FIG. 6 is a front detail view of the invention showing a rear vertical fence and a second auxiliary tape.

As shown in FIGS. 5 and 6, details of an optional rear fence 20 are shown. The rear fence 20 runs along the back of the wings as shown and is used to support pieces of wood to keep them square with respect to the saw blade. In the preferred embodiment, the rear fence has auxiliary tape measures attached to the front face of the rear fence (FIG. 6) and the top of the rear fence (FIG. 5). These auxiliary fences can be used to measure off lengths for cutting and can also be used with an adjustable stop 25. The adjustable stop is used to set a given length for cutting a number of boards. In this way, once the stop is set, many boards can be cut to the same length without having to measure each board.

Because the fence and the auxiliary tapes are attached to the wings, these tapes are also automatically calibrated to the blade when the initial set-up is performed. In this way, all tapes on the device coordinate to the blade.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A miter saw table for a miter saw having a blade and a support table comprising:

a) a center base portion, having an opening to receive a miter saw, said center base portion also having at least one slot formed therein;

b) at least one wing portion, having a flat top, said at least one wing portion forming a channel, whereby the at least one wing portion is slidably engaged in said center base portion such that said at least one wing portion is aligned with the support table of said miter saw;

c) a tape measure, mounted in said at least one wing portion;

d) a means for calibrating the tape measure to the blade of said miter saw, wherein the means for calibrating the tape measure include a means for moving said at least one wing portion longitudinally within said slot of said center base portion with respect to said center portion; and e) a means for securing said at least one wing portion to said center base portion such that said wing portion remains temporarily fixed in place for use.

2. The miter saw table of claim 1 wherein the means for securing said at least one wing portion are releasable such that the at least one wing portion can be adjusted as needed to recalibrate the tape measure, and then be locked in place for further use.

3. The miter saw table of claim 1 further comprising a means for supporting the center base portion above a ground surface.

4. The miter saw table of claim 1 wherein the tape measure is recessed into the flat top of said at least one wing portion.

5. The miter saw table of claim 1 further comprising a rear fence, having a front face and a top, attached to the flat top of said at least one wing portion.

6. The miter saw table of claim 5 wherein the rear fence has an auxiliary tape measure fixedly attached to the front face of the rear fence.

7. The miter saw table of claim 5 wherein the rear fence has an auxiliary tape measure fixedly attached to the top of the fence.

8. The miter saw table of claim 5 further comprising a workpiece stop, slidably attached to said rear fence.

9. A miter saw table for a miter saw having a blade and a support table comprising:

a) a center base portion having a flat table portion, said flat table portion having a first track; and a second track formed therein;

b) a right wing portion; having a flat top, and a bottom, said right wing portion forming a channel sized to fit into said first track on said center base portion;

c) a left wing portion, having a flat top and a bottom, said left wing portion forming a channel, sized to fit into said second track on said center base portion;

d) a tape measure, mounted in said flat top of said right wing portion; and e) a means for calibrating the tape measure to the blade of said miter saw.

10. The miter saw table of claim 9 wherein the means for calibrating the tape measure to the blade of said miter saw comprise:

a) a slot means, formed in said right wing portion such that said slot aligns with said first track of said center base portion;

b) a bolt placed through said slot of said right wing portion, such that the bolt extends downward into a subsidiary track formed in said center base portion; and c) a nut secured to said bolt, whereby said nut is positioned in said subsidiary track, such that said right wing portion can be moved within said first track of said center base portion until a desired position is reached and then secured in place by tightening said bolt and nut.

11. The miter saw table of claim 9 wherein the slot means comprises:

a) a pair of dovetails, formed on the bottom of said right wing portion.

12. The miter saw table of claim 9 further comprising a means for supporting the center base portion above a ground surface.

13. The miter saw table of claim 9 further comprising a means for slidably attaching said left wing portion to said center base portion.

14. The miter saw table of claim 13 wherein the means for slidably attaching said left wing portion to said center base portion comprise:

a) a slot means, formed in said left wing portion such that said slot aligns with said second track of said center base portion;

b) a bolt placed through said slot of said left wing portion, such that the bolt extends downward into a subsidiary track formed in said center base portion; and c) a nut secured to said bolt, whereby said nut is positioned in said subsidiary track, such that said left wing portion can be moved within said first track of said center base portion until a desired position is reached and then secured in place by tightening said bolt and nut.

15. The miter saw table of claim 9 further comprising a right rear fence, having a front face and a top, attached to the top of said right wing portions and a left rear fence attached to the top of said left wing portion.

16. The miter saw table of claim 15 wherein the rear fences have auxiliary tape measures fixedly attached to the front face of the right and left rear fences.

17. The miter saw table of claim 15 wherein the right and left rear fences have auxiliary tape measure fixedly attached to the top of the fence.

18. The miter saw table of claim 15 further comprising a workpiece stop, slidably attached to said right rear fence.

19. The miter saw table of claim 9 wherein the subsidiary track means comprise a pair of dovetail slots, formed in said center base portion.

20. A method of calibrating tape measures installed on a miter saw table having a miter saw with a blade;

a center base portion having a flat table portion, said flat table portion having a first track; and a second track formed therein; a right wing portion, having a flat top, and a bottom, said right wing portion forming a channel sized to fit into said first track on said center base portion; a left wing portion, having a flat top and a bottom, said right wing portion forming a channel, sized to fit into said second track on said center base portion; a tape measure, mounted in said flat top of said right wing portion; a slot means, formed in said right wing portion such that said slot aligns with said first track of said center base portion; a bolt placed through said slot of right wing portion such that the bolt extends downward into a subsidiary track means formed in said center base portion; and a nut secured to said bolt, whereby said nut is positioned in said subsidiary track means, such that said right wing portion can be moved within said first track of said center base portion until a desired position is reached and then secured in place by tightening said bolt and nut; a left wing portion, having a flat top, and a bottom, said left wing portion forming a channel sized to fit into said second track on said center base portion; a slot means, formed in said left wing portion such that said slot aligns with said second track of said center base portion; a bolt placed through said slot of left wing portion, such that the bolt extends downward into a subsidiary track means formed in said second track of said center base portion; and a nut secured to said bolt, whereby said nut is positioned in said subsidiary track means such that said left wing portion can be moved within said second track of said center base portion until a desired position is reached and then secured in place by tightening said bolt and nut, comprising the steps of:

a) sliding said right wing portion into said first track of said center base portion;

b) placing an auxiliary tape measure, having as tip, on said right wing portion such that the auxiliary tape measure aligns with the first tape measure and further such that the tip of said auxiliary tape measure touches said miter saw blade;

c) sliding said right wing portion in said first track until the measurement on said auxiliary tape measure aligns with the measurement on the first tape measure; and d) tightening the nut and bolt in said right wing portion to secure said right wing portion to said center base portion.

* * * * *